2,944,444
ROTARY SPEED REDUCER

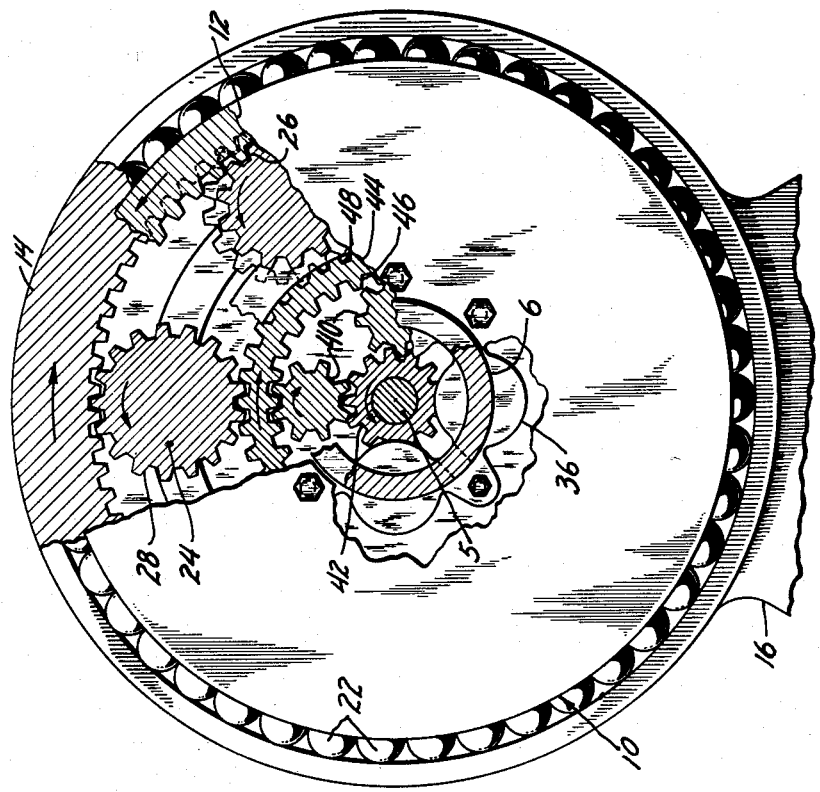
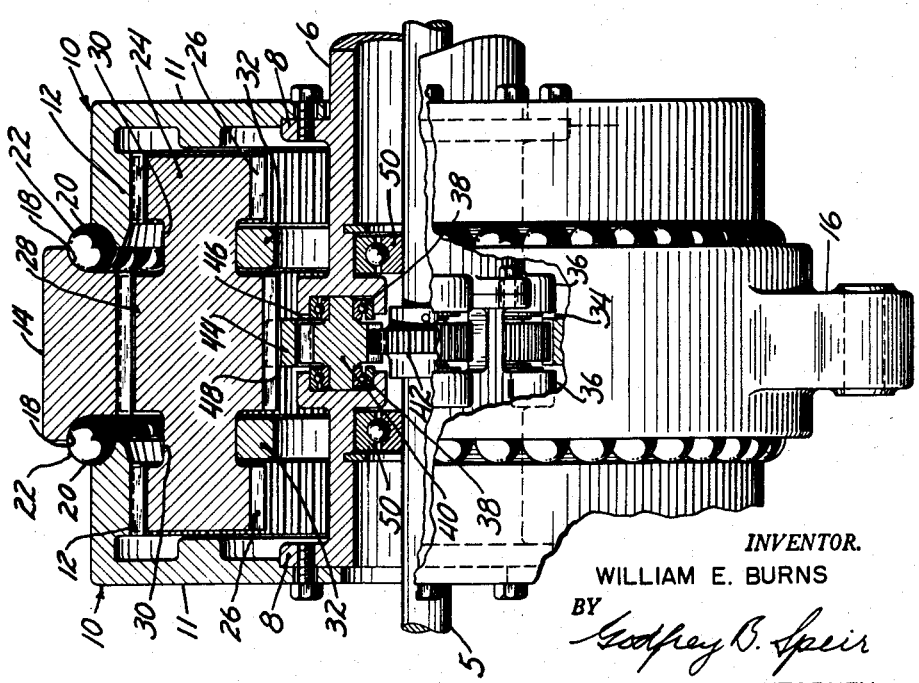
INVENTOR.
WILLIAM E. BURNS

William E. Burns, Denville, N.J., assignor to Curtiss-Wright Corporation, a corporation of Delaware Filed Sept. 22, 1959, Ser. No. 841,648

6 Claims. (Cl. 74—801)

This invention relates to rotary speed reducers designed for high torque capacity and having coaxial input and output members. In some respects it comprises modification of the inventions of Daniel Grudin as disclosed in patent applications, Serial No. 782,537, filed December 23, 1958, and Serial No. 810,339, filed May 1, 1959.

In the applications above referred to, constructions are disclosed providing planetary speed reducers having elements in multiple shear and having tangential loads on the gear system arranged to be balanced and to eliminate tipping and corner loading on the gear elements. However, the referred to structures while having a rotary input member which may rotate a substantial number of turns in either direction, carried an output member rotatable through only part of a revolution. While these other structures have a high degree of utility in many environments, they are unsuitable as disclosed where an output member is required to rotate a full turn or a plurality of turns in one direction or the other.

An object of the present invention is to provide a high ratio speed reducer or reduction gear having coaxial input and output shafts, where both shafts are capable of rotation through one or more full revolutions. A further object of the invention is to provide a compact planetary speed reducer assembly, using a special arrangement of planetary gearing, wherein an output shaft element may rotate through one or more turns in either direction coaxially with and in response to the rotation of an input shaft through a larger number of turns. Another object is to provide an arrangement, in a speed reducer, of transfer gearing by which power may be transmitted from one shaft to another shaft through a gearing system.

Details of the invention will be understood by reading the following description in connection with the attached drawings, wherein:

Fig. 1 is a fragmentary longitudinal view of a reduction gear according to the invention, partly in section, Fig. 2 is an end elevation, partly in section, showing the arrangement of part of the gearing.

The gearing assembly includes a small, relatively high speed input shaft 5 passing through and coaxial with a relatively low speed output shaft 6, the latter being stronger and stiffer than the input shaft since at low speed it is required to carry high torsional loads. Secured to axially spaced flanges 8 on shaft 6 are bell or internal gears 10 comprising end faces 11 and gear portions 12, the gear portions facing one another and being spaced apart to accommodate a coaxial third internal gear 14. Gear 14 normally comprises a reaction gear and is furnished with one or more lugs 16 adapted to be secured to a fixed structure. The adjacent ends of the gears 12 and 14 are provided with races 18 and 20 between which bearing balls 22 are disposed, whereby the gears 10 are piloted relative to the gear 14 for concentricity and for load distribution. Internal gears 12 have the same number of teeth which will differ as desired from the number of teeth in internal gear 14.

Within the annular cavity defined by the gears 10 and 14 and shaft 6, a plurality of circumferentially spaced planet members 24 are disposed, these members including pinions 26 meshed with internal gears 12 and a central pinion 28 meshed with internal gear 14. Between pinions 26 and 28 which have circular pitch like those of respective internal gears 12 and 14, cylindrical annular portions 30 are formed, either reduced in diameter relative to the pinions, as shown, or somewhat larger in diameter whereby the beam strength of the planet members 24 may be improved.

Preferably, the planet members 24 are not caged in a spider, as is usual with planetary gearing but rather, the pinions of these members are held in proper engagement with their meshing ring gears through the use of stiff rings 32 concentric with the assembly and engaging the cylindrical portions 30 on the planet members. Thus the planet members are held in firm outward engagement with the internal gears and are free to find those precise positions when load is being carried, by which torque load is evenly distributed circumferentially between the several planet members in their engagement with the ring gears. Also, since the reaction gear 14 lies between the similar gears 12, cocking of the planet members 24 is minimized and equal torque loads are imposed on the gears 12.

The central part of shaft 6 between flanges 8 is provided with a plurality of openings 34 bordered by bosses 36 formed to contain bearings 38. In these bearings transfer pinions or gears 40 are journalled, these gears 40 having inner runs within the hollow of the shaft 6 and outer runs externally of the shaft 6. Shaft 5 carries a drive pinion 42 meshed with the transfer gears 40 and driving the inner runs thereof. Embracing the transfer gears 40 is a ring gear 44 having internal teeth 46 engaging outer teeth on the transfer gears 40, and external teeth 48 engaged with the inner runs of teeth on the planet pinions 28 forming part of planet members 24. The ring gear 44 may be floating and does not necessarily require bearings since it is located between and by the transfer gears 40 and the planet pinions 28 and readily distributes the driving load from the gears to the pinions and is held concentric by those gears. Axial location of the ring gear 44 is afforded by the bosses 36 on the shaft 6.

If desired, pilot bearings 50 may be inserted between the shafts 5 and 6 to maintain concentricity and axial location therebetween.

When shaft 5 rotates, the transfer gears 40 are driven by the gear 42, in turn rotating the ring gear 44. The ring gear drives the planet members 24 causing them to rotate within and relative to the internal gears 12 and 14. Due to the tooth number difference between these internal gears and their meshing planet pinions, gears 12 are caused to rotate slowly with respect to the fixed internal gear 14, this slow rotation being imparted to the output shaft 6 secured to the gears 12. This slow rotation of course, orbits the transfer gears 40 slowly with shaft 6, which has minor effect upon the ratio of the system due to the high reduction ratio inherent in it. A change of ratio effected by orbiting of the transfer gears 40 is readily calculable in designing the system to attain a specific ratio between the input and output shafts. The interposition of the transfer gears in this system enables the output shaft 6 to rotate continuously in either direction in response to continuous rotation of the input shaft 5. Consequently the output member of the system is not limited to merely oscillatory angular movement to less than one full turn.

In the going description, various of the elements have been identified as input, output and fixed reaction elements to enable a clear understanding of the relationship of the parts. However, it should be clear to a designer that variations may be made in the system as to which elements are fixed and which are input or output. This gearing, though inherently of high ratio is reversible, and any one of the shafts 5, or 6 or gear 14 may constitute input, output or reaction elements.

It will be clear to those skilled in the art that various changes and modifications may be made in the structure shown and described without departing from the spirit and scope of the invention as set out in the appended claims.

I claim:

1. A high-ratio reduction gear comprising a high speed input shaft, a low speed hollow output shaft coaxial with and embracing the input shaft, a drive pinion on the input shaft, said output shaft having openings therein provided with bearings axially parallel to the input shaft, transfer gears rotatable in said bearings and engaging said drive pinion, a ring gear engaging and embracing said transfer gears; coaxial internal gears, one secured to said output shaft and one fixed, said internal gears having different tooth numbers, a plurality of planet members spaced around and within said internal gears, each said planet member having a pinion meshed with each said internal gear, and means to drive said planet members rotationally in response to rotation of said ring gear.

2. A high-ratio reduction gear mechanism comprising a high speed central input shaft, a hollow member coaxial with and surounding said input shaft, said member having openings in its wall and the wall having bearings adjacent said openings, transfer gears carried by said bearings, said input shaft having a drive pinion engaged with said gears, an internally and externally toothed ring gear embracing said transfer gears, the internal teeth thereof engaging said transfer gears, planetary members spaced around said ring gears having teeth thereon engaging the external teeth of the ring gear, internal gears embracing said planetary members having different numbers of teeth, a portion of each planetary member engaging each of said internal gears, and means securing at least one of said internal gears to said hollow member.

3. A high-ratio reduction gear comprising a hollow shaft, similar internal gears embracing said hollow shaft and secured thereto in axially spaced relation, another internal gear between said similar gears and journalled thereon, said internal gears and hollow shaft defining an annular cavity therewithin, a plurality of planet members spaced around said cavity each having toothed portions engaging all said internal gears, said hollow shaft having openings in the wall thereof, an input shaft passing coaxially into said hollow shaft, and gear means, passing through said hollow shaft openings, drivably connecting said planet members to said input shaft.

4. A high-ratio reduction gear comprising a hollow shaft, similar internal gears embracing said hollow shaft and secured thereto in axially spaced relation, another internal gear between said similar gears and journalled thereon, said internal gears and hollow shaft defining an annular cavity therewithin, a plurality of planet members spaced around said cavity each having toothed portions engaging all said internal gears, an input shaft passing coaxially into said hollow shaft, said shaft having a drive pinion thereon, said hollow shaft having openings in the wall thereof substantially in the plane of said drive pinion, transfer gears journalled in the wall of said hollow shaft engaged with said drive pinion, and a geared driving connection between said transfer gears and said planetary members.

5. A reduction gear according to claim 4 wherein said geared driving connection comprises an externally and internally toothed ring gear, the internal teeth thereof engaging said transfer gears and the external teeth thereof engaging teeth on said planetary members.

6. In a reduction gear, a hollow member having a wall opening, a transfer pinion in said opening and journalled on the hollow member, means within and coaxial with the hollow member drivably connected with said transfer pinion, a ring gear embracing said hollow member and drivably engaged with said transfer pinion, a plurality of planet pinion members arranged around said ring gear and drivably engaged therewith, each pinion member comprising end pinion portions of the same pitch diameter and a central pinion portion of different pitch diameter, gears secured to said hollow member one engaging end pinion portions at the one ends of said planet pinion members and the other of said gears engaging end pinion portions at the other ends of said planet pinion members, and a ring gear surrounding said planet pinion members drivably engaged with said central pinion portions.

No references cited.